United States Patent [19]
Benne

[11] 3,896,579
[45] July 29, 1975

[54] TROTLINE LIFTER

[76] Inventor: James K. Benne, 1625 E. 54th Pl., Tulsa, Okla. 74105

[22] Filed: Dec. 9, 1974

[21] Appl. No.: 530,759

[52] U.S. Cl. .................... 43/27.4; 43/6.5; 254/190 R
[51] Int. Cl.² .......................................... A01K 79/00
[58] Field of Search .................... 43/27.4, 4, 6.5; 254/190 R

[56] References Cited
UNITED STATES PATENTS

| | | | |
|---|---|---|---|
| 3,419,990 | 1/1969 | Lewis et al. | 43/6.5 |
| 3,654,721 | 4/1972 | Coleman | 43/6.5 |
| 3,664,637 | 5/1972 | Troiano | 254/190 R |

Primary Examiner—Louis G. Mancene
Assistant Examiner—Daniel J. Leach
Attorney, Agent, or Firm—William S. Dorman

[57] ABSTRACT

A trotline lifting device for attachment to the side of a fishing vessel to raise a submerged trotline as the fishing vessel moves along the trotline. The lifting device comprises an elongated tubular guide member having a longitudinal slot therein defined by an upper edge and a lower edge. The front end of the guide member has a point which projects forwardly and generally in the direction of the fishing vessel. An outwardly flared lip spirals upwardly and rearwardly from the point on the front end, and merges with the lower edge of the longitudinal slot as it projects rearwardly. An upwardly and rearwardly spiraling edge from the point on the front end merges with the upper edge of the longitudinal slot. An arm projecting laterally from the guide member is used to secure the lifting device to a fishing vessel.

4 Claims, 3 Drawing Figures

TROTLINE LIFTER

BACKGROUND OF THE INVENTION

1. Field of the Invention

This invention relates to a trotline lifting device and, more particularly, to a device that is used to lift, support, and guide a trotline to a position within easy reach of a fisherman who is inspecting or servicing the trotline from a fishing vessel.

2. Description of the Prior Art

Prior to this invention, a number of various means were employed to lift or guide a trotline. Perhaps the most widespread method for lifting a trotline was for the fisherman to grab the trotline by hand and pull himself forward, together with the boat, to inspect the trotline, remove the fish from the hooks, rebait the hooks, untangle the leaders, etc.

Among the other devices that have been used to service trotlines are those utilizing gears, such as in O. S. Lewis et al., U.S. Pat. No. 3,419,990 (1969); wheels, such as in T. W. Osborne, U.S. Pat. No. 3,626,627 (1971); and rollers, such as in E. A. Troiano, U.S. Pat. No. 3,664,637 (1972). Each of these devices utilizes moving parts, which are susceptible to wear and possibly jamming. In comparison, the simple design of the present invention utilizes no moving parts.

Another undesirable feature found in the prior art is that the fisherman is generally required to divert his attention from servicing the leaders and hooks of the main line to insure that the main line remains in position in the guide member. In the present invention, the main line is confined within a tubular guide member thereby insuring that the main line will remain within the guide member, thus permitting full attention to be directed to servicing the leaders and hooks of the trotline.

SUMMARY OF THE INVENTION

This invention comprises an elongated tubular guide member having a longitudinal slot defined by an upper and lower edge thereon. An outwardly projecting pointed front end initiates an outwardly flared lip which spirals upwardly and rearwardly from the point, the lip merging with the lower edge of the longitudinal slot of the tubular guide member. The point of the front end also initiates an upwardly and rearwardly spiraling edge which merges with the upper edge of the longitudinal slot of the tubular guide member. A support arm, projecting laterally from the tubular guide member, supports the lifting device, and provides a means for attaching the device to the side of a fishing vessel. The device is simple in design, having no moving parts, and assures guidance of the main line of a trotline, permitting a fisherman to direct his full attention to the inspection and servicing of the leaders of the trotline.

DESCRIPTION OF THE PREFERRED EMBODIMENT

Figure 1:
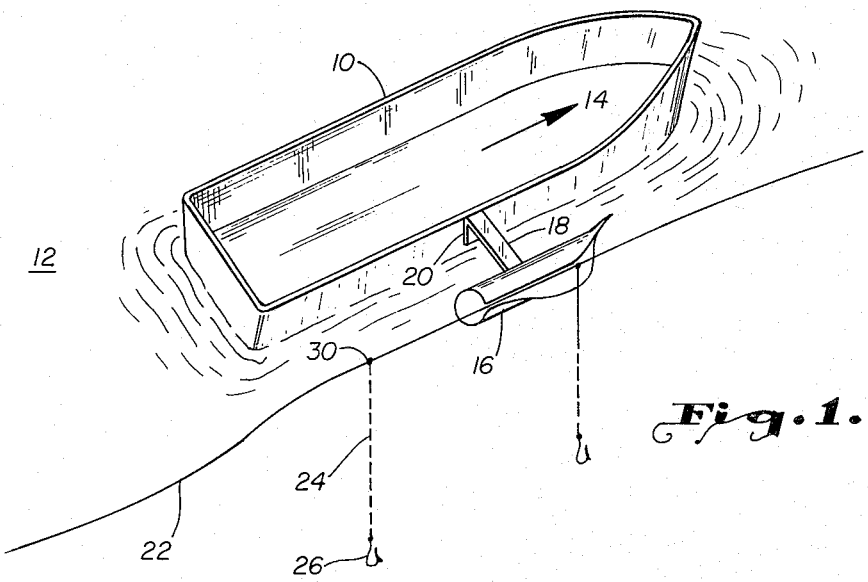
FIG. 1 is a panoramic view of the subject invention installed on a fishing vessel.

Referring to the drawings in detail, FIG. 1 shows a fishing vessel 10 floating on a body of water 12 and traveling in a forward direction 14. A trotline lifting device 16 is shown attached to the fishing vessel 10 by a lateral arm 18. The arm 18 has a downward right angle bend 20 on the end opposite that of the lifting device 16. The bend 20 is secured to the fishing vessel by any convention means, such as a C-clamp, thereby attaching the lifting device 16 to the fishing vessel 10.

A trotline of the type which has a main line 22 which is normally submerged beneath the surface of a body of water 12, is shown received within the lifting device 16. A plurality of leaders 24 and hooks 26 are spaced along the main line 22, and attached thereto by any conventional means 30.

Figure 2:
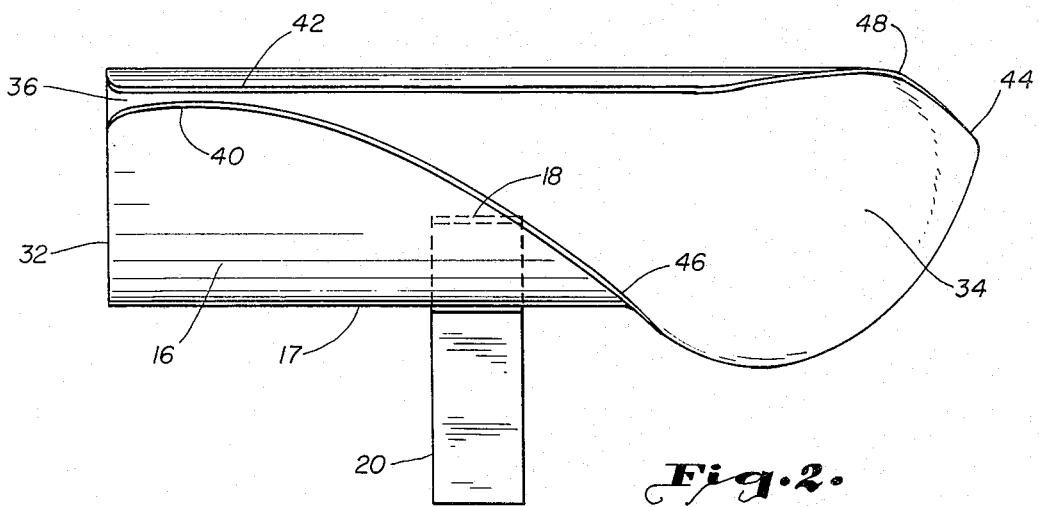
FIG. 2 is a side view of the subject invention.
Figure 3:
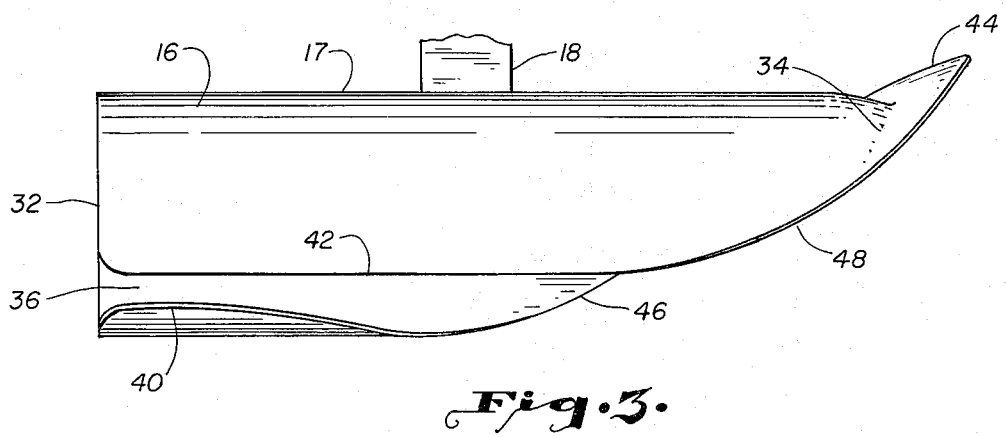
FIG. 3 is a plan view of the subject invention.

Referring now to FIGS. 2 and 3, the trotline lifting device 16 is shown as a substantially horizontal elongated tubular member 17 having a rear end 32 and a front end 34. A longitudinal slot 36 is defined on the member 17 by a lower edge 40 and an upper edge 42. The front end 34 of the member 17 has an outwardly projecting point 44, projecting generally in the direction of the fishing vessel 10. From the point 44 on the front end 34, an outwardly flared lip 46 spirals upwardly and rearwardly and merges with the lower edge 40 of the slot 36 as the lip approaches the rear end 32. From the point 44 on the front end 34, an upwardly and rearwardly spiraling edge 48 merges with the upper edge 42 of the slot 36. As shown in FIGS. 2 and 3, the flared lip 46 tapers from the point 44 until it merges with the lower edge 40 of the slot 32. The spiraling edge 48 is also shown tapering from the point 44 as it merges with the upper edge 42 of the slot 36.

The arm 18 is shown extending laterally from the member 17, and is secured thereto by any conventional means, such as nuts and bolts. The arm 18 has a downward right angle bend 20 so located that the lifting device 16 is conveniently located with respect to the side of the fishing vessel 10. Any conventional means for attaching the arm 18, or the bend 20, to the fishing vessel (such as a C-clamp or screws) may be used.

Utilization of the lifting device is extremely simple and straightforward. With the lifting device attached to the side of a fishing vessel 10 and extending over the water, as shown in FIG. 1, the main line 22 of the trotline is picked up and placed within the member 17 through the slot 36. The configuration of the member 17 insures that the main line 22 will remain within the member 17. As the boat progresses forward, for example, under power of a trolling motor, the leaders 24 encounter the front end of the body 17. The outwardly projecting point 44 directs the leaders 24 into engagement with the flared lip 46, thereby raising the leaders for inspection and service as required. It should be obvious that a device of reverse configuration could be attached to the rear end 32 should the need arise to service the main line 22 while traveling in a reverse direction.

The simple design lends itself to rugged construction. By way of example, the preferred embodiment could be made of any smooth rigid plastic material, such as PVC. The smooth contours and surfaces of the device insure virtually trouble-free operation. Insertion of the main line 22 within the elongated tubular body 17 is easily accomplished through the slot 36, while the configuration of the device assures the retention of the line within the body.

What is claimed is:

1. In combination with a trotline of the type having a main line which is normally submerged beneath the surface of a body of water, and which is normally fixedly located at its ends, and having a plurality of spaced leaders attached to said main line, said leaders having hooks attached to the free ends thereof; a trotline lifting device wherein the improvement comprises an elongated guide member having a front end and a rear end, an outwardly flared lip spiraling upwardly and rearwardly from said front end to said rear end, means for attaching said guide member to the side of a fishing vessel, said guide member engaging said main line of said trotline therein and said lip engaging said leaders of said trotline thereon, thereby lifting said leaders so that said leaders may be inspected and serviced, said leaders progressing along said lip as said fishing vessel advances along said main line and said leaders disengaging from said guide member as said leaders pass beyond the rear end thereof.

2. A trotline lifting device as set forth in claim 1 wherein said elongated guide member is comprised of a horizontal tubular member, said tubular member having a longitudinal slot defined by an upper end and a lower edge, said flared lip merging with said lower edge of said slot.

3. A trotline lifting device as set forth in claim 2 wherein said front end is an outwardly projecting point, being generally in the direction of said fishing vessel, said point being the forwardmost projection of said flared lip of said lower edge of said slot, said point also being the forwardmost projection of the upwardly and rearwardly spiraling upper edge of said slot.

4. A trotline lifting device as set forth in claim 3 wherein said means for attaching said guide member to the side of a fishing vessel comprises an arm attached at one end thereof to said guide member and projecting laterally therefrom, said arm having a 90° downward bend thereon at the end opposite from said one end (attached to said guide member), said opposite end being secured to said fishing vessel by any conventional means.

* * * * *